(12) United States Patent
Wheeler et al.

(10) Patent No.: US 9,392,248 B2
(45) Date of Patent: Jul. 12, 2016

(54) DYNAMIC POV COMPOSITE 3D VIDEO SYSTEM

(71) Applicant: Google Inc., Mountain View, CA (US)

(72) Inventors: Aaron Joseph Wheeler, San Francisco, CA (US); Christian Plagemann, Menlo Park, CA (US); Hendrik Dahlkamp, Palo Alto, CA (US); Liang-Yu Chi, San Francisco, CA (US); Yong Zhao, San Jose, CA (US); Varun Ganapathi, San Francisco, CA (US); Alejandro Jose Kauffmann, San Francisco, CA (US)

(73) Assignee: Google Inc., Mountain View, CA (US)

( * ) Notice: Subject to any disclaimer, the term of this patent is extended or adjusted under 35 U.S.C. 154(b) by 400 days.

(21) Appl. No.: 13/914,727

(22) Filed: Jun. 11, 2013

(65) Prior Publication Data

US 2015/0172634 A1    Jun. 18, 2015

(51) Int. Cl.
*H04N 13/00* (2006.01)
*H04N 21/218* (2011.01)
*H04N 21/234* (2011.01)
*H04N 21/2365* (2011.01)
*H04N 21/4223* (2011.01)
(Continued)

(52) U.S. Cl.
CPC ..... *H04N 13/0014* (2013.01); *H04N 21/21805* (2013.01); *H04N 21/2365* (2013.01); *H04N 21/23412* (2013.01); *H04N 21/4223* (2013.01); *H04N 21/816* (2013.01); *H04N 13/0239* (2013.01); *H04N 13/0271* (2013.01)

(58) Field of Classification Search
CPC ....................................................... G06T 15/20

USPC .............. 345/427, 424; 348/42–60, 135–139
See application file for complete search history.

(56) References Cited

U.S. PATENT DOCUMENTS 7,471,292 B2    12/2008    Li
8,044,952 B2    10/2011    Li
(Continued)

FOREIGN PATENT DOCUMENTS

EP        2375746        10/2011
WO    2007/013194        2/2007
(Continued)

OTHER PUBLICATIONS

'Wikipedia' [online]. "Free viewpoint television," Oct. 13, 2013 [retrieved on Jul. 29, 2014]. Retrieved from the internet: URL <http://en.wikipedia.org/wiki/Free_viewpoint_television>, 3 pages.
(Continued)

*Primary Examiner* — Andy Rao
(74) *Attorney, Agent, or Firm* — Fish & Richardson P.C.

(57) ABSTRACT

Systems and techniques are disclosed for visually rendering a requested scene based on a virtual camera perspective request as well as a projection of two or more video streams. The video streams can be captured using two dimensional cameras or three dimensional depth cameras and may capture different perspectives. The projection may be an internal projection that maps out the scene in three dimensions based on the two or more video streams. An object internal or external to the scene may be identified and the scene may be visually rendered based on a property of the object. For example, a scene may be visually rendered based on where an mobile object is located within the scene.

31 Claims, 6 Drawing Sheets

(51) Int. Cl.
*H04N 21/81* (2011.01)
*H04N 13/02* (2006.01)

(56) References Cited

U.S. PATENT DOCUMENTS

| | | | |
|---|---|---|---|
| 8,064,647 B2 * | 11/2011 | Bazakos et al. | 382/117 |
| 8,106,924 B2 | 1/2012 | Aliprandi et al. | |
| 8,421,870 B2 | 4/2013 | Kang et al. | |
| 8,903,521 B2 | 12/2014 | Goree et al. | |
| 8,905,855 B2 | 12/2014 | Fitzpatrick et al. | |
| 8,941,723 B2 | 1/2015 | Bentley et al. | |
| 8,944,928 B2 | 2/2015 | Kaps et al. | |
| 2002/0158873 A1 * | 10/2002 | Williamson | 345/427 |
| 2012/0212509 A1 * | 8/2012 | Benko et al. | 345/633 |
| 2012/0269494 A1 * | 10/2012 | Satyanarayana et al. | 386/248 |
| 2013/0147801 A1 * | 6/2013 | Kurino | 345/420 |
| 2014/0146139 A1 | 5/2014 | Schwartz et al. | |

FOREIGN PATENT DOCUMENTS

| | | | | |
|---|---|---|---|---|
| WO | 2009/108028 | | 9/2009 | |
| WO | WO 2013039470 A1 * | 3/2013 | | H04N 13/00 |

OTHER PUBLICATIONS

'Wikipedia' [online]. "Bullet time," Jul. 29, 2014 [retrieved on Jul. 29, 2014]. Retrieved from the internet: URL<http://en.wikipedia.org/wild/Bullet_time>, 5 pages.

'Wikipedia' [online]. "QuickTime VR," May 31, 2014 [retrieved on Jul. 29, 2014]. Retrieved from the internet: URL<http://en.wikipedia.org/wiki/QuickTime_VR>, 3 pages.

'Wikipedia' [online]. "Google Street View," Jul. 28, 2014 [retrieved on Jul. 29, 2014]. Retrieved from the internet: URL<http://en.wikipedia.org/wiki/Google_Street_View>, 15 pages.

Evers-Senne et al.,"Image-based Rendering of Complex Scenes from a Multi-Camera Rig", Vision, Image and Signal Processing, IEEE Proceedings, vol. 152, Issue 4, Aug. 2005.

Fisher,"Model-Based Rendering", Available at: http://homepages.inted.ac.uk/rbf/CVonline/LOCAL_COPIES/LIVATINO2/MainApprRWS/node2.html. Date visited: Apr. 23, 2013.

Nguyen et al.,"Depth image-based rendering from multiple cameras with 3D propagation algorithm", IMMERSCOM '09 Proceedings of the 2nd International Conference on Immersive Telecommunications, May 2009.

* cited by examiner

DYNAMIC POV COMPOSITE 3D VIDEO SYSTEM

BACKGROUND

Traditionally, a scene, such as a movie or a sporting event, is captured from a single perspective in two dimensions. Accordingly, a rendering of the scene from second perspective, different from the original perspective, in two or three dimensions is not available to a user. As an example, at a given time, a scene in a movie is captured from a single perspective using a single camera and the perspective may be modified by either moving the camera or by switching to a different camera that is located in a different position than the original camera. The resulting scene is one that is captured from a single perspective at any given time and, thus, cannot be viewed or analyzed from a different perspective. Additionally, a user viewing a video feed that is captured using traditional techniques is limited to the perspectives that the video feed is captured in such that the perspective may not be changed based on user input or as a result of a predetermined setting. For example, a user may receive a video feed of a basketball game captured from the south end of the basketball court and may not have an option to switch the video feed to display the basketball game from the north end of the basketball court.

BRIEF SUMMARY

According to implementations of the disclosed subject matter, a first video stream may be received from a first camera configured to capture a first perspective and a second video stream may be received from a second camera configured to capture a second perspective. Additionally, a virtual camera perspective request may be received from a user or based on a predetermined attribute and may identify an object. The first video stream and the second video stream may be projected onto a three dimensional scene. A requested scene may be visually rendered based on the virtual camera perspective and the projection of the first video stream and the second video stream onto the three dimensional scene. The requested scene may be visually rendered based on an object property such as an object location, orientation and/or history which may be determined using an object sensor.

Systems and techniques according to the present disclosure allow two or more video feeds to be projected onto a three dimensional scene and for a requested scene to be rendered based on the visual camera perspective and the projection of at least two video streams. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Viewing a video from a single perspective corresponding to the perspective from which the video was captured may limit a viewer's viewing experience. Specifically, an arrangement configured such that a viewer may only view a video feed from a single, predetermined perspective may not allow a user to be exposed to a more complete view of a given scene. As an example, a video feed for a speech given in an auditorium may be captured using a video camera located at the southeast corner of the auditorium. Accordingly, a user viewing the video feed may only be able to view the speech from the southeast perspective and may not be able to view the video from, for example, the northwest perspective. According to implementations of the disclosed subject matter, multiple video streams may be captured from multiple cameras configured to capture different perspectives. The video streams may be projected onto a three dimensional scene such that the projection results in a more complete understanding of the scene. Notably, the three dimensional projection of the video streams may not be rendered visually but, rather, may be projected such that scene data is generated for a subsequent rendering. For example, a video feed from a north end of a stage and a video feed from an east end of a stage may both be projected onto a three dimensional scene. The projection of the three dimensional scene my contain data from both the video feeds and, additionally, may generate data for portions of the scene that is not within the video feeds. Notably, receiving video data for the same scene from the two video feeds may enable the arrangement to stitch together a three dimensional projection of the scene that is richer than either standalone stream. The arrangement may receive a virtual camera perspective request from a user or from predetermined criteria as disclosed herein. The virtual camera perspective request may identify an object such as an object from within a scene. A requested scene may be rendered based on a three dimensional projection of multiple video feeds as well as the virtual camera perspective request. For example, a basketball game may be captured using multiple video feeds that are projected onto a three dimensional scene. A user may provide a virtual camera perspective request by designating the basketball as an object of interest. Accordingly, the user may be provided with a visual rendering of the basketball game from the perspective of the basketball based on the projection of the multiple feeds, capturing the game, onto the three dimensional scene. More specifically, the user may be provided with a visual rendering of the basketball game based on the location and/or the orientation of the basketball.

Figure 1:
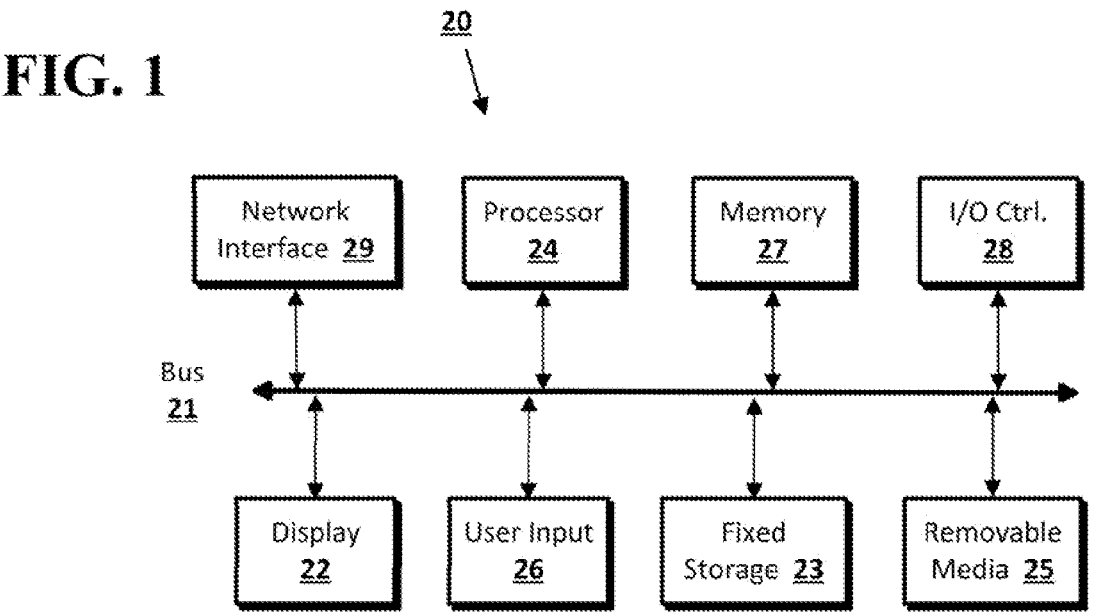
FIG. 1 shows a computer according to an implementation of the disclosed subject matter.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
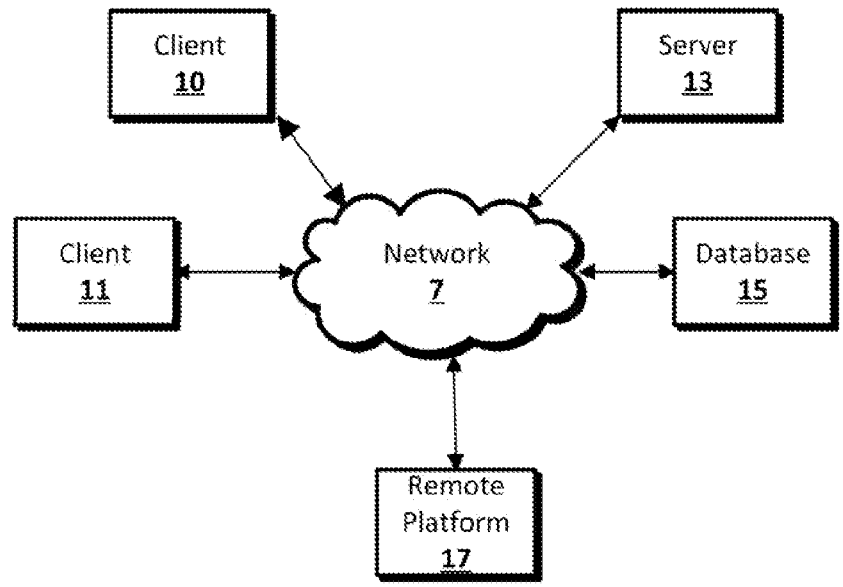
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
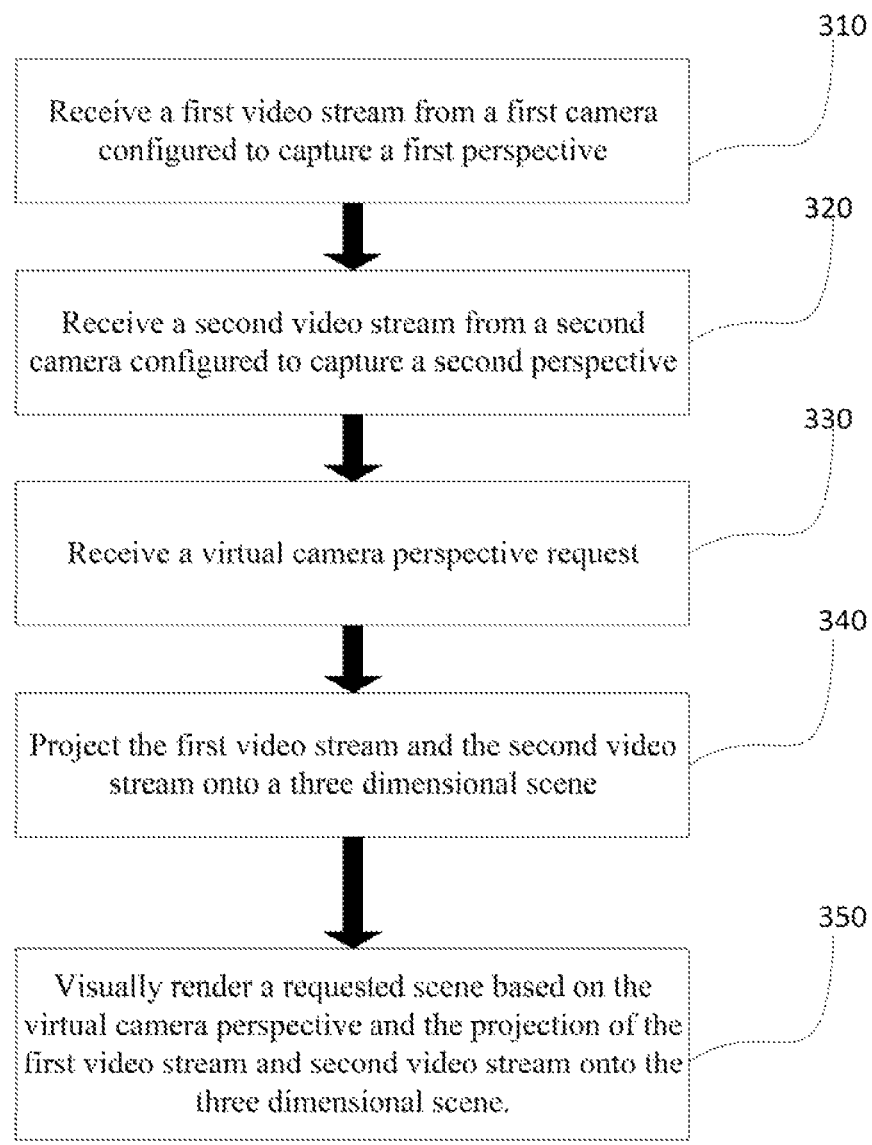
FIG. 3 shows an example process for rendering a requested scene, according to an implementation of the disclosed subject matter.

According to an implementation of the disclosed subject matter, as shown at steps 310 and 320 in FIG. 3, multiple video streams may be received by the arrangement. The video streams may capture the same scene from different perspectives such that, for example, multiple cameras used to capture the multiple video streams may be placed in different areas around a scene being captured. The multiple video streams may not capture the same scene in its entirety such that, for example, a first video stream may cover 100% of a given scene and a second video stream may only cover 60% of the scene that the first video stream covers and 40% of a scene that is unique to the second video stream. As an example, a first video camera may be used to capture the Washington Monument and the Tidal Basin in Washington, D.C., from a first perspective, and a second video camera may be used to capture the Washington Monument and the Jefferson Memorial, also in Washington, D.C. from a second perspective. Notably, both video cameras capture the Washington Monument and a three dimensional projection may be generated on at least the Washington Monument portion of the scene. A video stream may be received by the arrangement in any applicable manner such as via a wireless connection (e.g., a Wi-Fi, Bluetooth, satellite, infrared, via a base station, WLAN, LAN etc.), or a wired connection (e.g., a network connection, via a modem, a cable, a wire, etc.) or the like. The multiple video streams may be captured using a traditional two dimensional camera, a three dimensional camera, a depth camera, or the like or a combination thereof. For example, a two dimensional camera may be used to capture a speech in an auditorium from the southeast corner of the auditorium and a three dimensional depth camera may be used from the northeast corner of the auditorium. A three dimensional depth camera can include a camera that is capable of measuring the three dimensional position of a point, area or object in its field of view. Alternatively, as an example, multiple three dimensional depth cameras may be arranged around the auditorium to capture the speech.

A video stream may be either a physical video stream or a virtual video stream. A physical video stream may be a stream that captures a live reality such as individuals, animals, objects, events, entities, and the like that occur in the physical world. A virtual video stream may be a stream that is generated with the use of a computer and may include computer graphics, a virtual render, or the like. The arrangement may utilize a combination of a physical video stream and a virtual video stream in order to generate a three dimensional projection of a scene.

According to an implementation of the disclosed subject matter, as shown at step 340 in FIG. 3, two or more video streams may be projected onto a three dimensional scene. The projection of the video streams may not be an actual rendering of a three dimensional scene but, rather, may be a mathematical and/or electronic mapping of the data extracted from the multiple video streams onto an imaginary three dimensional scene. For example, a first video stream may contain numerous data points for a given scene and each data point may have associated coordinates, magnitude, and color triplet associated with it. An example triplet may be:

{[32.22, 4.32, 17.32], 4, #AF1E2D}

The [32.22, 4.32, 17.32] may correspond to an X, Y, Z coordinate position for the example data point and may allow the arrangement to determine where the data point is located. The '4' may correspond to a magnitude for the brightness of the data point within the scene. The hex code #AF1E2D may correspond to the color at the data point. Accordingly, the arrangement may extract the data from the first video stream and match the data from the first video stream with a second video stream. The combination of the data from the first video stream and the second video stream may allow the arrangement to develop a three dimensional projection of the entire scene. Continuing the previous example, as shown, the first video stream may contain data for coordinate position [32.22, 4.32, 17.32]. However, the first video stream may not contain data for an adjoining point [33, 5, 18] whereas the second video stream may contain data for the adjoining point [33, 5, 18]. Accordingly, the arrangement may extract the data for the first point [32.22, 4.32, 17.32] from the first stream and the data for the second point [33, 5, 18] from the second stream to generate a three dimensional projection of the scene containing data point information from both the first and the second streams. The three dimensional projection may be generated by any entity capable of generating the projection such as a computer (e.g., a desktop, a laptop, a mobile phone, a tablet, a device with a microchip, etc.), local server, remote server (e.g., a cloud server, a physically remote server, etc.), database, or the like. The arrangement may utilize the three dimensional projection of the scene to visually render a requested scene, as disclosed herein.

A larger number of video feeds that are used to generate a three dimensional projection of a scene may result in a more detailed scene. For example, a scene containing a coffee table may be captured using a first video feed from the left side of the table. The first video feed may not contain data for the right side of the coffee table and a three dimensional projection of the first feed would contain no more information than already contained in the first feed. A second feed captured from the right side of the coffee table may also be captured and projected onto the three dimensional scene. The second feed may contain information in addition to the first feed and, thus, a three dimensional projection generated from the first and second feed would contain more information than only a projection based on the first feed. The resulting projection may contain information about both the left and right side of the coffee table, but may not contain information about the bottom of the base for the coffee table. Similarly, a third feed captured from underneath the coffee table may be captured and projected onto the three dimensional scene, resulting in a richer projection in comparison to the projection based only on the first and second feed. Specifically, the resulting projection would contain information corresponding to the left, right, and bottom of the coffee table. According to an implementation of the disclosed subject matter, the arrangement may predict and/or generate data for portions of the three dimensional projection that are not available directly from a video feed using any applicable technique such as those defined by the MPEG-1, MPEG-2, MPEG-3, MPEG-4, H.261, H.263, High Efficiency Video Coding (HEVC) standard or the like. For example, a three dimensional projection may receive information about the left and right side of a coffee table from two video feeds but may not receive information about the bottom of the coffee table. The arrangement may generate data corresponding to the bottom of the coffee table using any applicable standard to complete the three dimensional projection.

Figure 4:
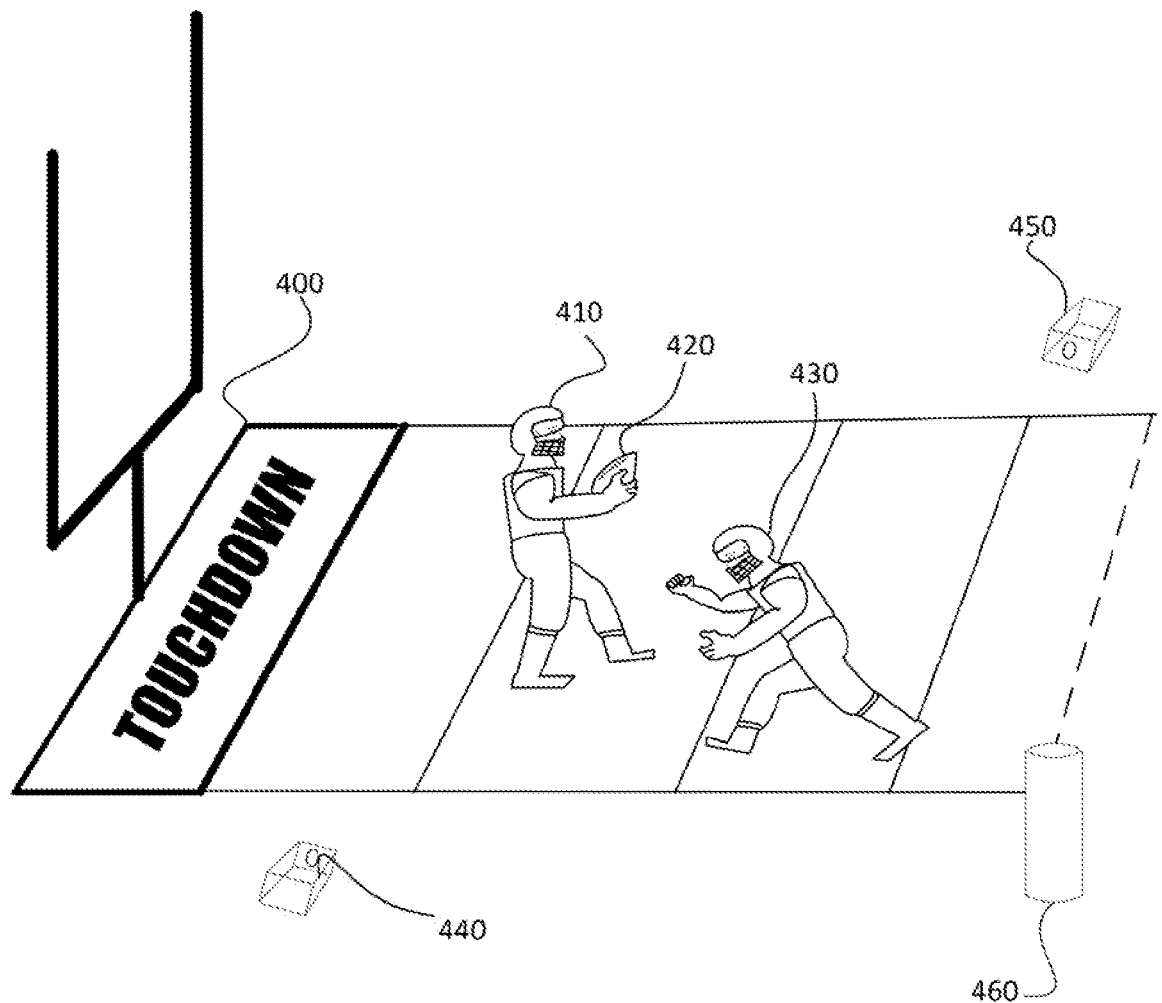
FIG. 4 shows an example illustration of a scene, including objects, captured by multiple perspectives, according to an implementation of the disclosed subject matter.

According to an implementation of the disclosed subject matter, as shown at step 330, the arrangement may receive a virtual camera perspective request. A virtual camera perspective request may be a request that identifies a perspective or object such that a visual render of a scene is provided to a viewer based on the identified perspective or a perspective based on an identified object. As an example, a virtual camera perspective request may be [the right side of the scene] such that a resulting render of the scene is provided as if a virtual camera is positioned to capture the scene from the right side. As disclosed herein, the scene may be visually rendered to a viewer as if a camera was located at the position of the virtual camera. The virtual camera perspective request may be originated by a user such as a viewer, a developer, a program coordinator, a producer, or the like, or may be based on programed criteria that is either predetermined or dynamically determined. The request may be input by a user using any applicable input technique such as a keyboard, controller, keypad, mouse, mouse pad, joystick, motion detector, heat detector, touch detector, sound detector, or the like, that can register any applicable input such as a selection, tap, swipe, wave, press, touch, motion, sound, or the like. A perspective may be identified using any applicable criteria such as an angle, a yaw, a direction (e.g., northwest, southwest, east, etc.), a relative direction (e.g., from the right of, from above, from behind, etc.), or the like. As an example, a program coordinator that oversees the transmission of a basketball game may, using voice command, submit a virtual camera perspective request of [to the right of the visitor's bench]. Accordingly, using the techniques disclosed herein, a visual render of the basketball game may be transmitted from the perspective of a camera directly to the right of the visitor's bench. Similarly, as an example, a viewer viewing the basketball game may use a remote control to submit a virtual camera perspective request of [behind the visitor's bench]. Accordingly, using the techniques disclosed herein, a visual render of the basketball game may be transmitted from the perspective of a virtual camera behind the visitor's bench. As an illustrative example, as shown in FIG. 4, a football game may be captured using cameras 450 and 440. A user viewing the game on a television set may provide a virtual camera perspective request that the game is rendered from the perspective of object 460.

Figure 6A:
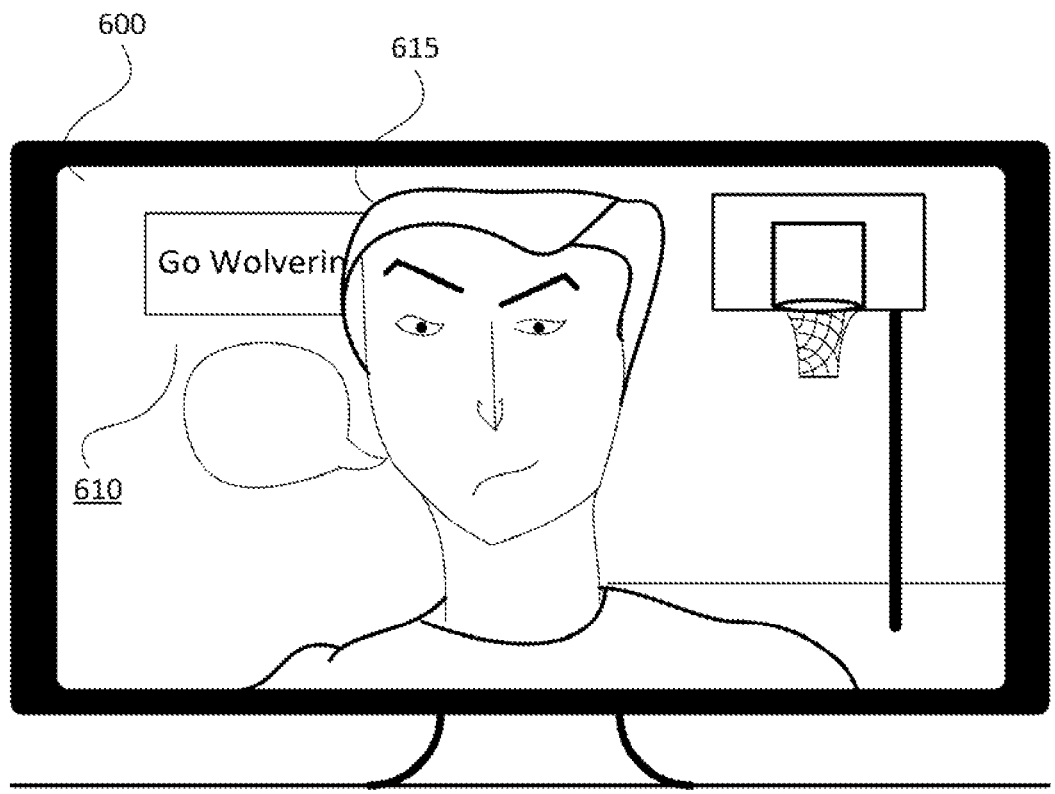
FIG. 6a shows an example illustration of rendering a first perspective, according an implementation of the disclosed subject matter.
Figure 6B:
FIG. 6b shows an example illustration of rendering a second perspective, according an implementation of the disclosed subject matter.

Programmed criteria that are either predetermined or dynamically determined may establish a virtual camera perspective request. The criteria may be programmed by any applicable entity such as a developer, programmer, machine program, or the like and may be utilized by the arrangement to visually render a requested scene. A predetermined criteria for establishing a virtual camera perspective request may include a time (e.g., request X perspective at 14:00, request a perspective for a given time range, etc.), a condition such as an object position (e.g., request a perspective based on object location) or a user preference (e.g., viewer preference, producer preference, etc.), an event, or the like. As an example, the arrangement may query a viewer profile to determine a perspective that the user prefers and, based on the query, establish a respective virtual camera perspective request. A dynamically determined criteria for establishing a virtual camera perspective request may include an in focus entity (e.g., a speaker speaking, a player with a ball, a ball, etc.), an object position and/or an object position in relation to another object's position (e.g., a ball, a ball and a defender, an actor speaking while moving, etc.), a score, an event, an ambient condition (e.g., weather condition, lighting condition, sound condition, etc.), or the like. In an illustrative example of utilizing dynamic programmed criteria to establish a virtual camera perspective request, as shown in FIG. 6a and FIG. 6b, a first speaker 615 within a scene 600 may be speaking. The arrangement may be configured to request a virtual camera perspective that it is from the point of view of an entity that can view the speaking entity. Accordingly, while the first person 615 speaks, a virtual camera perspective 610 that places the virtual camera across from the first person 615 is requested, effectively allowing a visual render of the first person to be displayed to a viewer as the first person speaks. Similarly, while a second person 625 speaks, a virtual camera perspective 620 that places the virtual camera across from the second person 625 is requested, effectively allowing a visual render of the second person to be displayed to a viewer as the second person speaks.

Figure 7A:
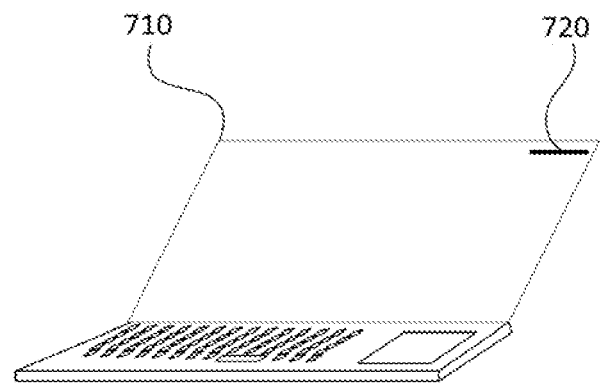
FIG. 7a shows an example illustration of object containing an object sensor, according to an implementation of the disclosed subject matter.

As disclosed herein, a virtual camera perspective may be based on an object and, more specifically, and may be based on an object property. An object property may be any applicable property such as an object location, object orientation, object history, object composure, change in an attribute corresponding to the object, or the like. For example, an object history may correspond to a set of locations the object has previously been placed in from within a given scene. The object history may enable the arrangement to predict which virtual camera perspectives are likely to be requested based on the object. An object may be identified based on a sensor placed in and/or on the object. The sensor may be any applicable sensor that enables detection of an object property such as a location sensor, a motion sensor, a signal imitator (e.g., a GPS signal, Bluetooth signal, infrared signal, RFID signal, a sonar signal, etc.), a heat sensor, a beacon, an accelerometer, a gyroscope, or the like. For example, the sensor may be a GPS transmitter that transmits a GPS coordinates to a GPS receiver. The GPS receiver may receive the transmitted GPS coordinates to determine an object location. Additionally, a gyroscope may transmit object orientation to a receiver. The arrangement may utilize the object location and orientation to request a virtual camera perspective. As an illustrative example, as shown in FIG. 7a, a laptop computer 710 may contain a location sensor 720. The arrangement may receive a virtual camera perspective request corresponding to the location of the laptop 710 such that a visual render is requested to be generated form the point of view of the laptop. Accordingly, the sensor may transmit location information and a receiver may provide the arrangement with the laptop's location, allowing the arrangement to request a respective virtual camera perspective.

An object, as disclosed herein, may be a part of a scene or be located external to a scene. An object that is part of a scene may be one that is within at least one video feed that is projected onto a three dimensional scene. For example, a projection of a three dimensional scene of a football game, generated based on multiple video feeds, may contain numerous players as well as a football. A player on the field or the football may be an object that is part of the scene. An object external to a scene may be one that is not part of at least one of the video feeds that are projected onto a three dimensional scene and may be an object that is not part of any of the video feeds projected onto the three dimensional scene. For example, a projection of a three dimensional scene of a football game, generated based on multiple video feeds, may contain numerous players as well as a football. An audience member located in the stands may who is not part of any video feed nor the three dimensional projection may be identified as an object. As disclosed herein, the football game may be visually rendered to a viewer from the point of view of the audience member based on the location of the audience member and the three dimensional projection of the scene. It will be understood that an object that is either part of a scene or is external to a scene may change positions and the perspective may change accordingly. For example, an external object may be a camera that moves along a path from position A to position B. Accordingly, a visual render may be based on the location of the external object (i.e., the camera) and may also move along the path from position A to position B.

Figure 7B:
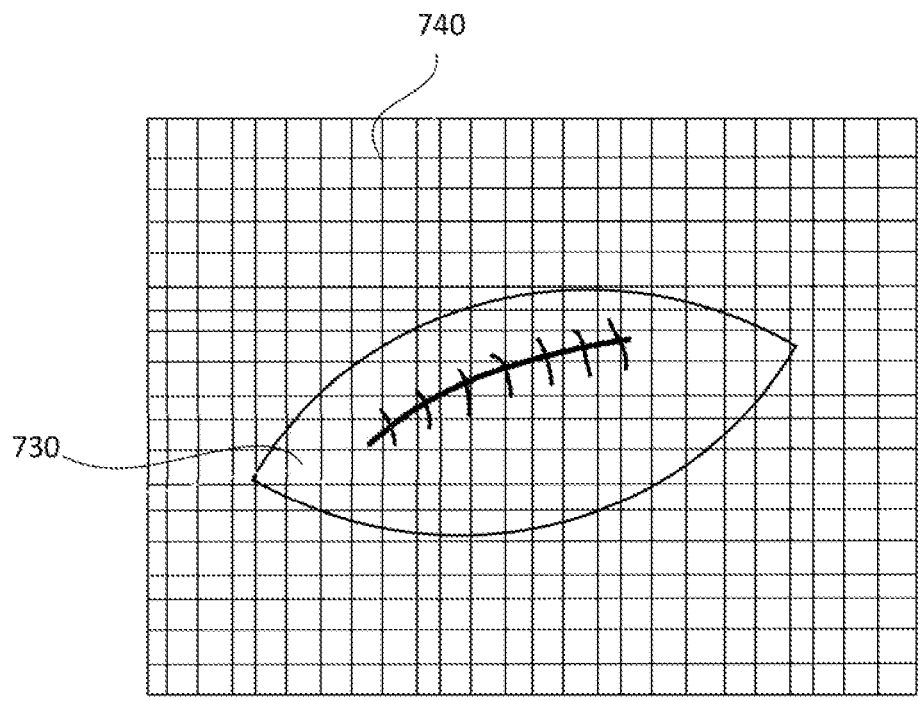
FIG. 7b shows an example illustration of detecting an object shape, according to an implementation of the disclosed subject matter.

Alternatively, an object may be identified based on any applicable recognition technique such as a pattern recognition technique, an object recognition technique, a computer vision technique, image based object recognition, or the like. A recognition technique may be applied to either a video feed or a three dimensional projection of multiple video feeds to detect an object from within the feed or the projection of the scene. A virtual camera perspective request may be received based on the identified object and a scene may be visually rendered based on an object property. As an illustrative example, as shown in FIG. 7b, a user may identify a football as the object to base the virtual camera perspective on and, thus, the arrangement may utilize a pattern recognition technique 740 to identify a football 730 from within the three dimensional projection of a scene. The arrangement may continuously utilize the pattern recognition technique to identify the football's location, allowing a visual render of the scene to be current based on the location of the football.

According to an implementation of the disclosed subject matter, as shown at step 350, the arrangement may visually render a requested scene based on a virtual camera perspective and the projection of multiple video streams. As disclosed herein, multiple video feeds may be projected onto a three dimensional scene and a virtual camera perspective may be requested by a user or based on predetermined criteria. The projection onto the three dimensional scene may enable a visual rendering from multiple different perspectives as the two or more video feeds projected onto the three dimensional scene may contain ample data for the arrangement to visually render multiple different perspectives. As an example, a scene may be captured by three different cameras located in three different locations and configured to capture three different perspectives. The arrangement may receive the three video feeds and project them onto a three dimensional scene that amalgamates the data contained in the three feeds to produce a three dimensional projection of the scene. As disclosed herein, the three dimensional projection of the scene may not be visually rendered but, rather, may be a mathematical and/or electronic computation of data contained within the scene. The arrangement may visually render a two or three dimensional image or video based on the three dimensional projection and the received virtual camera perspective request such that the visual render is from the perspective of the requested virtual camera. As an example, a scene may contain a character and a virtual camera perspective from the point of view of the character's eyes may be requested. Accordingly, the visual render of the scene may be from the point of view of the character's eyes such that as the character moves within the scene, the virtual render is automatically updated to reflect the portion of the scene in the direction of the character's line of sight.

Figure 5:
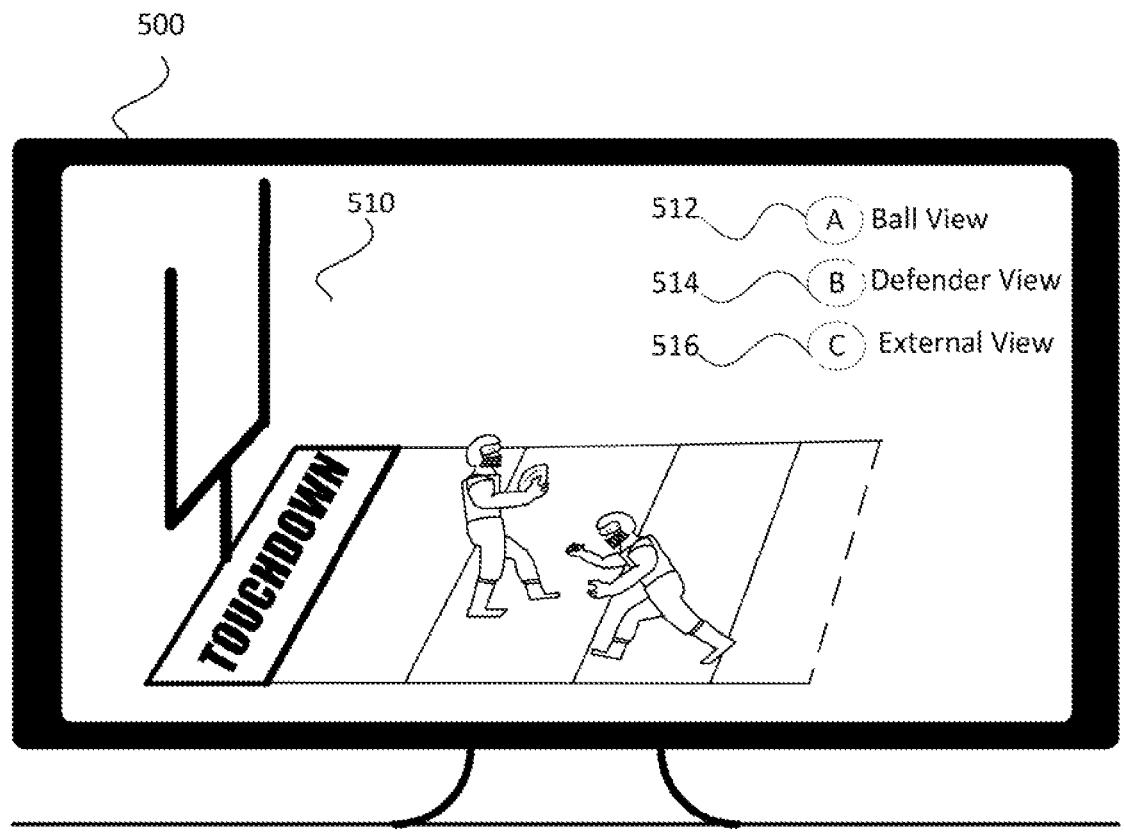
FIG. 5 shows an example illustration of selecting a perspective, according to an implementation of the disclosed subject matter.
Figure 5:
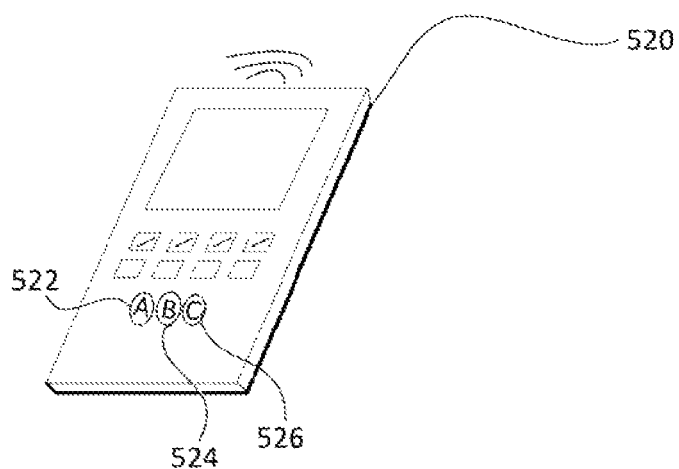

In an illustrative example of the disclosed subject matter, as shown in FIG. 4, a football game 400 may be captured via a first camera 440 and a second camera 450. The football game may contain a first player wearing a first helmet 410, a second player wearing a second helmet 430 and a football 420. The arrangement may receive a first video feed from the first camera 440 and a second video feed form the second camera 450 and project the two video feeds onto a three dimensional scene, as disclosed herein. As shown in FIG. 5, a user viewing the football game on a television 500 may have an option to change the perspective in which the game is rendered to the viewer. The user may use a remote control 520 to select a button that provides the arrangement with a respective virtual camera perspective request. Selecting the button A 522 may correspond to the on screen option for selecting a Ball View 512. Similarly, selecting the button B 524 may correspond to the on screen option for selecting a Defender View 514 and selecting the button C 526 may correspond to the on screen option for selecting an External View 516. Selecting the button A 522 (i.e., Ball View) may result in a visual render of the football game from the point of view of the ball 420. Similarly, selecting the button B 524 (i.e., Defender View) may result in a visual render of the football game from the point of view of the defender's helmet 430 and selecting the button C 526 (i.e., External View) may result in a visual render of the football game from the point of view of the object 420 located external to the scene. In a similar example, the arrangement may be configured such that the perspective of a visual render provided to a viewer is automatically modified based on a condition. The condition may be that a default view of the game is from the perspective of the external object 460, however, if the defender's helmet 430 is within a threshold proximity of the football 420, then the arrangement provides a virtual render of the scene from the defender's perspective.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
obtaining (i) a first image of a scene as viewed by a first depth camera from a first perspective, and (ii) a second image of the scene as viewed by a second depth camera from a different, second perspective;
generating, based on the first image that corresponds to the scene as viewed by the first depth camera from the first perspective, first data that references (i) a three-dimensional coordinate position associated with each point in the first image, (ii) a brightness characteristic associated with each point in the first image, and (iii) a color characteristic associated with each point in the first image;
generating, based on the second image that corresponds to the scene as viewed by the second depth camera from the second perspective, second data that references (i) a three-dimensional coordinate position associated with each point in the second image, (ii) a brightness characteristic associated with each point in the second image, and (iii) a color characteristic associated with each point in the second image;
generating, based at least on the first data and the second data, a three-dimensional projection of the scene;
determining a different, third perspective of the scene as the scene would be viewed from a particular position in three-dimensional space;
generating, based at least on the generated three-dimensional projection of the scene, a virtual image of the scene as the scene would be as viewed from the third perspective; and
providing the virtual image of the scene for output.

2. The method of claim 1, wherein each point in the first and second images corresponds to a pixel.

3. The method of claim 1, further comprising:
receiving data identifying a particular object having the particular position in three-dimensional space;
identifying the particular position in three-dimensional space as the particular object's position in three-dimensional space; and
wherein determining the different, third perspective of the scene as would be viewed from the particular position in three-dimensional space comprises:
based on identifying the particular position in three-dimensional space as the particular object's position in three-dimensional space, determining the different, third perspective of the scene as would be viewed from the particular object's position in three-dimensional space.

4. The method of claim 3, wherein identifying the particular position in three-dimensional space as the particular object's position in three-dimensional space comprises:
obtaining data from one or more sensors indicating the particular object's position in three-dimensional space.

5. The method of claim 4, wherein obtaining data from one or more sensors indicating the particular object's position in three-dimensional space comprises:
obtaining data from a GPS transmitter indicating the particular object's geographical position.

6. The method of claim 4, wherein the particular object is shown in neither the first image of the scene nor the second image of the scene.

7. The method of claim 3, wherein identifying the particular position in three-dimensional space as the particular object's position in three-dimensional space comprises:
identifying, based on one or more of the first and second images, the particular position in three-dimensional space as the particular object's position in three-dimensional space.

8. The method of claim 7, wherein identifying, based on one or more of the first and second images, the particular position in three-dimensional space as the particular object's position in three-dimensional space comprises:
applying one or more recognition processes to at least one of the first and second images to identify the particular position in three-dimensional space as the particular object's position in three-dimensional space.

9. The method of claim 7, wherein the particular object is shown in one or more of the first and second images of the scene.

10. The method of claim 3, further comprising:
identifying, at a particular point in time after providing the virtual image of the scene for output, another position in three-dimensional space as the particular object's position in three-dimensional space at the particular point in time;
updating, based at least on the three-dimensional projection of the scene, the virtual image of the scene to reflect the scene as would be viewed from the particular object's position in three-dimensional space at the particular point in time; and
providing the updated virtual image of the scene for output.

11. The method of claim 3, wherein:
receiving data identifying the particular object having the particular position in three-dimensional space comprises receiving, from a client device, indication of a user of the client device having selected the particular object; and
providing the virtual image of the scene for output comprises providing the virtual image of the scene for output at the client device.

12. The method of claim 3, wherein receiving data identifying the particular object having the particular position in three-dimensional space comprises:
in response to a set of criteria being satisfied, receiving data identifying the particular object having the particular position in three-dimensional space.

13. A system comprising:
one or more computers and one or more storage devices storing instructions that are operable, when executed by the one or more computers, to cause the one or more computers to perform operations comprising:
obtaining (i) a first image of a scene as viewed by a first depth camera from a first perspective, and (ii) a second image of the scene as viewed by a second depth camera from a different, second perspective;
generating, based on the first image that corresponds to the scene as viewed by the first depth camera from the first perspective, first data that references (i) a three-dimensional coordinate position associated with each point in the first image, (ii) a brightness characteristic associated with each point in the first image, and (iii) a color characteristic associated with each point in the first image;
generating, based on the second image that corresponds to the scene as viewed by the second depth camera from the second perspective, second data that references (i) a three-dimensional coordinate position associated with each point in the second image, (ii) a brightness characteristic associated with each point in the second image, and (iii) a color characteristic associated with each point in the second image;
generating, based at least on the first data and the second data, a three-dimensional projection of the scene;
determining a different, third perspective of the scene as the scene would be viewed from a particular position in three-dimensional space;
generating, based at least on the generated three-dimensional projection of the scene, a virtual image of the scene as the scene would be as viewed from the third perspective; and
providing the virtual image of the scene for output.

14. The system of claim 13, wherein each point in the first and second images corresponds to a pixel.

15. The system of claim 13, wherein the operations further comprise:
receiving data identifying a particular object having the particular position in three-dimensional space;
identifying the particular position in three-dimensional space as the particular object's position in three-dimensional space; and
wherein determining the different, third perspective of the scene as would be viewed from the particular position in three-dimensional space comprises:
based on identifying the particular position in three-dimensional space as the particular object's position in three-dimensional space, determining the different, third perspective of the scene as would be viewed from the particular object's position in three-dimensional space.

16. The system of claim 15, wherein identifying the particular position in three-dimensional space as the particular object's position in three-dimensional space comprises:
obtaining data from one or more sensors indicating the particular object's position in three-dimensional space.

17. The system of claim 16, wherein obtaining data from one or more sensors indicating the particular object's position in three-dimensional space comprises:
obtaining data from a GPS transmitter indicating the particular object's geographical position.

18. The system of claim 16, wherein the particular object is shown in neither the first image of the scene nor the second image of the scene.

19. The system of claim 15, wherein identifying the particular position in three-dimensional space as the particular object's position in three-dimensional space comprises:
identifying, based on one or more of the first and second images, the particular position in three-dimensional space as the particular object's position in three-dimensional space.

20. The system of claim 19, wherein identifying, based on one or more of the first and second images, the particular position in three-dimensional space as the particular object's position in three-dimensional space comprises:
   applying one or more recognition processes to at least one of the first and second images to identify the particular position in three-dimensional space as the particular object's position in three-dimensional space.

21. The system of claim 19, wherein the particular object is shown in one or more of the first and second images of the scene.

22. The system of claim 15, wherein the operations further comprise:
   identifying, at a particular point in time after providing the virtual image of the scene for output, another position in three-dimensional space as the particular object's position in three-dimensional space at the particular point in time;
   updating, based at least on the three-dimensional projection of the scene, the virtual image of the scene to reflect the scene as would be viewed from the particular object's position in three-dimensional space at the particular point in time; and
   providing the updated virtual image of the scene for output.

23. The system of claim 15, wherein:
   receiving data identifying the particular object having the particular position in three-dimensional space comprises receiving, from a client device, indication of a user of the client device having selected the particular object; and
   providing the virtual image of the scene for output comprises providing the virtual image of the scene for output at the client device.

24. The system of claim 15, wherein receiving data identifying the particular object having the particular position in three-dimensional space comprises:
   in response to a set of criteria being satisfied, receiving data identifying the particular object having the particular position in three-dimensional space.

25. A non-transitory computer-readable storage device having instructions stored thereon that, when executed by a computing device, cause the computing device to perform operations comprising:
   obtaining (i) a first image of a scene as viewed by a first depth camera from a first perspective, and (ii) a second image of the scene as viewed by a second depth camera from a different, second perspective;
   generating, based on the first image that corresponds to the scene as viewed by the first depth camera from the first perspective, first data that references (i) a three-dimensional coordinate position associated with each point in the first image, (ii) a brightness characteristic associated with each point in the first image, and (iii) a color characteristic associated with each point in the first image;
   generating, based on the second image that corresponds to the scene as viewed by the second depth camera from the second perspective, second data that references (i) a three-dimensional coordinate position associated with each point in the second image, (ii) a brightness characteristic associated with each point in the second image, and (iii) a color characteristic associated with each point in the second image;
   generating, based at least on the first data and the second data, a three-dimensional projection of the scene;
   determining a different, third perspective of the scene as the scene would be viewed from a particular position in three-dimensional space;
   generating, based at least on the generated three-dimensional projection of the scene, a virtual image of the scene as the scene would be as viewed from the third perspective; and
   providing the virtual image of the scene for output.

26. The storage device of claim 25, wherein the operations further comprise:
   receiving data identifying a particular object having the particular position in three-dimensional space;
   identifying the particular position in three-dimensional space as the particular object's position in three-dimensional space; and
   wherein determining the different, third perspective of the scene as would be viewed from the particular position in three-dimensional space comprises:
      based on identifying the particular position in three-dimensional space as the particular object's position in three-dimensional space, determining the different, third perspective of the scene as would be viewed from the particular object's position in three-dimensional space.

27. The storage device of claim 26, wherein identifying the particular position in three-dimensional space as the particular object's position in three-dimensional space comprises:
   obtaining data from one or more sensors indicating the particular object's position in three-dimensional space.

28. The storage device of claim 26, wherein identifying the particular position in three-dimensional space as the particular object's position in three-dimensional space comprises:
   identifying, based on one or more of the first and second images, the particular position in three-dimensional space as the particular object's position in three-dimensional space.

29. The storage device of claim 26, wherein the operations further comprise:
   identifying, at a particular point in time after providing the virtual image of the scene for output, another position in three-dimensional space as the particular object's position in three-dimensional space at the particular point in time;
   updating, based at least on the three-dimensional projection of the scene, the virtual image of the scene to reflect the scene as would be viewed from the particular object's position in three-dimensional space at the particular point in time; and
   providing the updated virtual image of the scene for output.

30. The storage device of claim 26, wherein:
   receiving data identifying the particular object having the particular position in three-dimensional space comprises receiving, from a client device, indication of a user of the client device having selected the particular object; and
   providing the virtual image of the scene for output comprises providing the virtual image of the scene for output at the client device.

31. The storage device of claim 26, wherein receiving data identifying the particular object having the particular position in three-dimensional space comprises:
   in response to a set of criteria being satisfied, receiving data identifying the particular object having the particular position in three-dimensional space.

* * * * *